United States Patent
Albanese et al.

(10) Patent No.: US 7,883,594 B2
(45) Date of Patent: Feb. 8, 2011

(54) WRAPPED PILE WEATHERSTRIPPING AND METHODS OF MAKING SAME

(75) Inventors: James V. Albanese, Lyons, NY (US); Robert C. Horton, Canandaigua, NY (US); Alan J. DeMello, New Market, NH (US); Thongdy Chanthabane, Farmington, NY (US)

(73) Assignee: Ultrafab, Inc., Farmington, NY (US)

( * ) Notice: Subject to any disclaimer, the term of this patent is extended or adjusted under 35 U.S.C. 154(b) by 593 days.

(21) Appl. No.: 10/572,338

(22) PCT Filed: Oct. 15, 2003

(86) PCT No.: PCT/US03/32753

§ 371 (c)(1),
(2), (4) Date: Mar. 17, 2006

(87) PCT Pub. No.: WO2005/046982

PCT Pub. Date: May 26, 2005

(65) Prior Publication Data

US 2007/0094934 A1    May 3, 2007

(51) Int. Cl.
*B32B 37/00* (2006.01)
(52) U.S. Cl. .................. 156/73.1; 156/308.2; 49/498.1
(58) Field of Classification Search ............... 156/73.1, 156/73.2, 217, 308.2, 309.6, 580.1, 580.2; 49/498.1, 499.1; 428/85, 88, 89, 92, 93, 428/97
See application file for complete search history.

(56) References Cited

U.S. PATENT DOCUMENTS

| | | | |
|---|---|---|---|
| 228,526 A | 6/1880 | Grant | |
| 543,932 A | 8/1895 | Hall et al. | |
| 1,914,217 A | 6/1933 | Schlegel | |
| 2,968,072 A | 1/1961 | Bright | |
| 3,359,686 A | 12/1967 | Kondolf | |

(Continued)

*Primary Examiner*—James Sells
(74) *Attorney, Agent, or Firm*—Kenneth J. Lukacher; Martin Lukacher

(57) ABSTRACT

Pile weatherstripping, which is clad with a wrapping of a film (14, 25, 104, 216) of flexible material, has one or more rows (19, 27, 100, 102, 212, 214) of pile (10, 24, 105, 233) on a backing (12, 28, 106, 218) in side-by-side relationship. The wrapping film material conforms to the outside surface of the row (19, 27, 100, 102, 214) of pile so as to define a bulb or bulbs which are completely filled with pile. Single row (19, 27) pile weatherstripping is made by wrapping the pile (10, 24) with the film material (14, 25) after first ultrasonically welding the film material along one edge thereof to the backing (12, 28) under the pile. Then, the film material (14, 25) may be bent around the pile as it moves through a guide (88). The film material (14, 25) is then attached along the opposite edge to the backing thereof so as to completely enclose and clad the row (19, 27) of weatherstripping. The film material may be wrapped around one row (214) of two adjacent rows (212, 214) of pile (233) and attached to the backing (218), leaving the other row (212) unclad. The film material (104) may be wrapped separately around adjacent rows and attached to the backing (106) to provide two clad rows (100, 102) of weatherstripping. By selection of the porosity of the film material (14, 25, 104, 216) and the density of the pile (10, 24, 105, 233), weatherstripping having desired compressibility and air and water infiltration control properties may be produced.

29 Claims, 18 Drawing Sheets

U.S. PATENT DOCUMENTS

| | | |
|---|---|---|
| 3,604,153 A | 9/1971 | Hess |
| 3,745,053 A | 7/1973 | Johnson et al. |
| 4,028,456 A | 6/1977 | Lind |
| 4,078,106 A | 3/1978 | Lind |
| RE30,359 E | 8/1980 | Metzler |
| 4,305,984 A | 12/1981 | Boyce |
| 4,307,139 A | 12/1981 | Yackiw |
| 4,318,249 A | 3/1982 | Landreth |
| 4,358,497 A | 11/1982 | Miska |
| 4,538,380 A | 9/1985 | Colliander |
| 4,713,130 A | 12/1987 | Evans et al. |
| 5,192,586 A | 3/1993 | Mertinooke et al. |
| 5,338,382 A | 8/1994 | Johnson et al. |
| 5,807,451 A | 9/1998 | Johnson |
| 2002/0062597 A1* | 5/2002 | Heroux .................. 49/472 |

\* cited by examiner

WRAPPED PILE WEATHERSTRIPPING AND METHODS OF MAKING SAME

DESCRIPTION

The present invention relates to pile weatherstripping and particularly to pile weatherstripping having a pile or piles which are wrapped with flexible material to form a cladding over the pile. The present invention provides pile weatherstripping having sealing and air and water infiltration control characteristics of both conventional pile weatherstripping and foam weatherstripping.

Conventional pile weatherstripping, such as sold in substantial quantities by Ultrafab, Inc. of Farmington, N.Y., USA, contains a row of pile with internal and/or external fins. Such pile weatherstripping and methods of making some are described in Larry E. Johnson et. al., U.S. Pat. No. 5,338,382, issued Aug. 16, 1994 and Larry E. Johnson, U.S. Pat. No. 5,807,451, issued Sep. 15, 1998 and in the documents referenced therein. Foam weatherstripping or weatherseals may have a resilient strip of foam, or other elastomeric material, alone or with the aid of a low-function skin extruded over the strip. Such foam or elastomeric weatherstripping and methods for making same are described in Mertinooke et. al., U.S. Pat. No. 5,192,586, issued Mar. 9, 1993 and Colliander, U.S. Pat. No. 4,538,380, issued Sep. 3, 1985. The present invention provides a pile weatherstripping which may be tailored to have desired sealing characteristics, from a complete seal against air and water infiltration characteristic of foam and elastomeric type weatherstripping to controlled air and water infiltration characteristics and dispersal characteristic which may be found in pile weatherstripping.

In addition, a wrapped or clad pile weatherstripping provided in accordance with the invention also has compressibility in terms of the amount of force to compress and reduce the thickness of the weatherstripping; for example by ½, which is compatible with foam or elastomeric weatherstripping. Another feature of clad weatherstripping provided by the invention is reliability in applications where the surface which is sealed undergoes sliding motion, as is the case with sliding doors and windows. The compressibility of the pile for such sliding applications reduces the risk of nicking or tearing to which elastomeric and foam seals are subject, even when the foam is coated with a non-stick (low friction) skin.

Although pile weatherstripping has been designed with bulbs outside the pile or with the pile inside the bulb, performance emulating foam and elastomeric seals (bulk seals), while having tailored compressibility and air and water infiltration characteristics, has not been obtained. Many variations of bulb/pile designs, configurations have been proposed over the years. See, for example, Grant, U.S. Pat. No. 228,526, issued Jun. 8, 1880; Hall et. al., U.S. Pat. No. 543,932, issued Aug. 6, 1895; Schlegel, U.S. Pat. No. 1,914,217, issued Jun. 13, 1933; Bright, U.S. Pat. No. 2,968,072, issued Jan. 17, 1961; Kondolf, U.S. Pat. No. 3,359,686, issued Dec. 26, 1967; Hess, U.S. Pat. No. 3,604,153, issued Sep. 14, 1971; Johnson et. al., U.S. Pat. No. 3,745,053, issued Jul. 10, 1973; Lind, U.S. Pat. No. 4,028,456, issued Jun. 7, 1977; Metzler, U.S. Pat. Re. 30,359, reissued Aug. 5, 1980; Boyce, U.S. Pat. No. 4,305,984, issued Dec. 15, 1981; Yackiw, U.S. Pat. No. 4,307,139, issued Dec. 22, 1981; Landreth, U.S. Pat. No. 4,318,249, issued Mar. 9, 1982; and Miska, U.S. Pat. No. 4,358,497, issued Nov. 9, 1982.

It was found, in accordance with the present invention, that the necessary and desirable characteristics for emulating foam weatherstripping and enhancing the sealing and air and water infiltration characteristics of pile weatherstripping were not obtained with prior pile weatherstripping designs because they lacked an effective sheathing or cladding of the pile. It was found in accordance with the present invention that providing a film of flexible material both encasing the pile and conforming to the pile, as for example by providing a bulb completely filled with the pile, is effective in presenting a weather seal simulating a foam or elastomeric weather seal and also having tailorable air and water infiltration and compressibility characteristics. The flexible film presents, on one side, a sealing surface and, on the other side, a surface which is yieldably supported by the pile. In accordance with different embodiments of the invention, effective compressibility and fluid infiltration control may be obtained in a pile weatherstripping having two rows of pile adjacent to each other in side-by-side relationship. One of these rows may be clad with the flexible film material, which forms a longitudinal bulb filled with the pile of the one row. The other row remains unclad, the weatherstripping therefore has the characteristics of a foam emulating side and a pile side. In accordance with another embodiment of the invention, both rows of pile are confined in bulbs by the flexible film. This dual clad pile has enhanced sealing and infiltration control characteristics.

In accordance with the method of making the enhanced pile weatherstripping product afforded by the invention, a pile is formed by winding yarn on an endless mandrel or band, as shown in the Larry E. Johnson patents referenced above. The film, preferably a web of felted or flocked fibrous material, such as used for the fins of conventional pile weatherstripping, is attached with the pile along one edge of the film to a backing. The attachment is preferably by means of ultrasonic welding. The film extends beyond the height of the pile and is bent to wrap the film to encase the pile into a completely pile-filled bulb. The film is then attached, again preferably by ultrasonic welding, to the backing from which the pile projects. By laying the film material inside the mandrel and winding the yarn forming the pile over the film, a length or lengths of film extend from the inside of the pile and divide the pile into adjacent side-by-side rows. The film is then bent over one or more of these rows to provide pile weatherstripping with one row of wrapped pile and another of free upstanding pile, or with two (dual) rows of wrapped pile.

Accordingly, it is a principal feature of the present invention to provide improved pile weatherstripping, and also to methods of making same.

It is a more specific feature of the present invention to provide improved pile weatherstripping having a cladding or wrapping of material around one row or either or both of a pair of rows of pile, and also to methods for making same.

It is a further feature of the present invention to provide improved pile weatherstripping having characteristics simulating foam or elastomeric weather seals and having tailorable compressibility and infiltration control characteristics, and also to methods of making such pile weatherstripping.

The foregoing and other features and advantages of the invention, as well as presently preferred embodiments of weatherstrip products and methods of making them, all in accordance with the invention, will become more apparent from a reading of the following description in connection with the accompany drawings in which.

Figure 1:
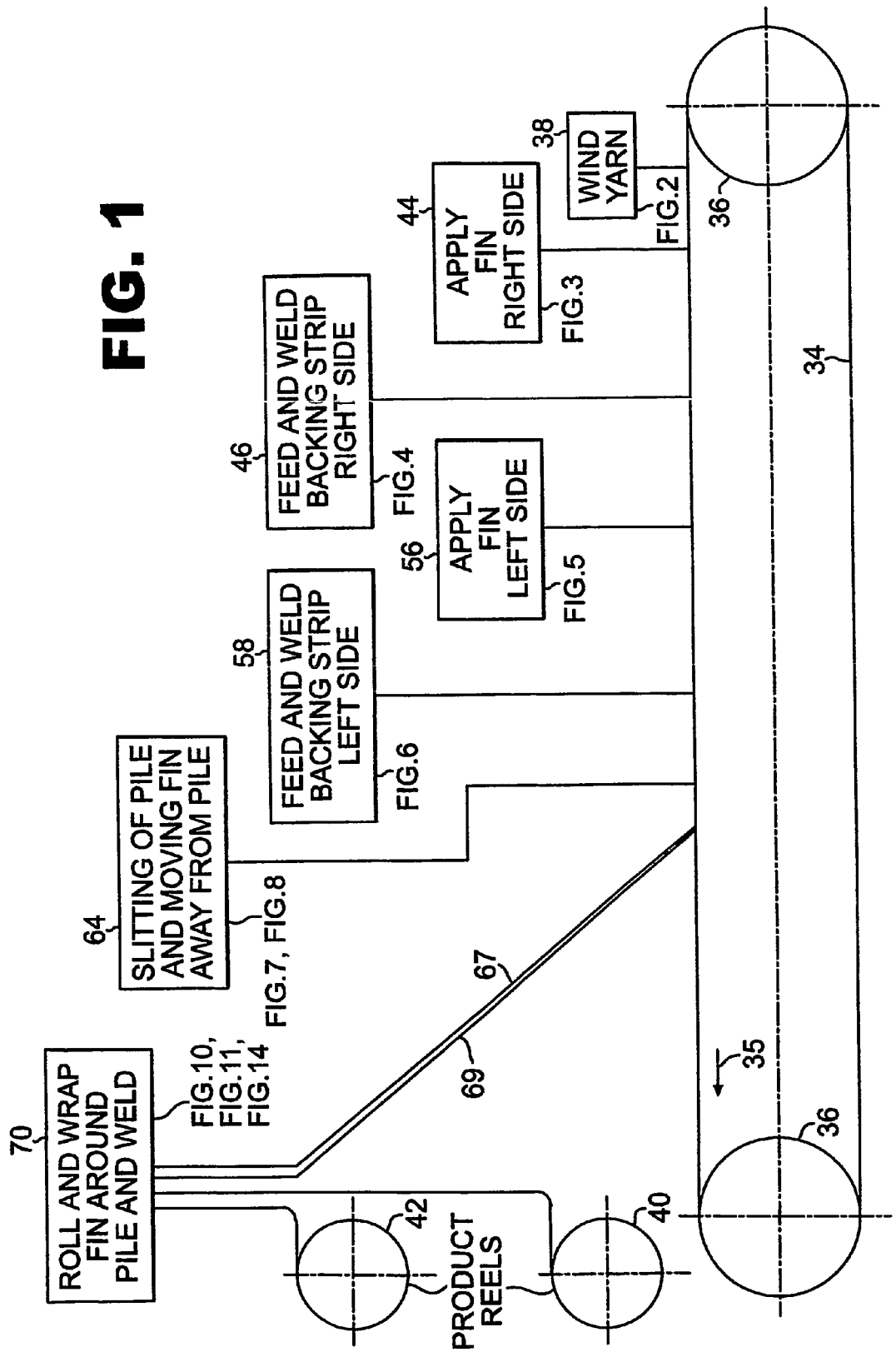
FIG. 1 is a process diagram showing the method of making pile weatherstripping in accordance with a first embodiment of the invention; the FIGS. indicated in FIG. 1, mentioned below, illustrate the cross sections of the weatherstripping in stages of manufacture, as the steps in the method are carried out.
Figure 12:
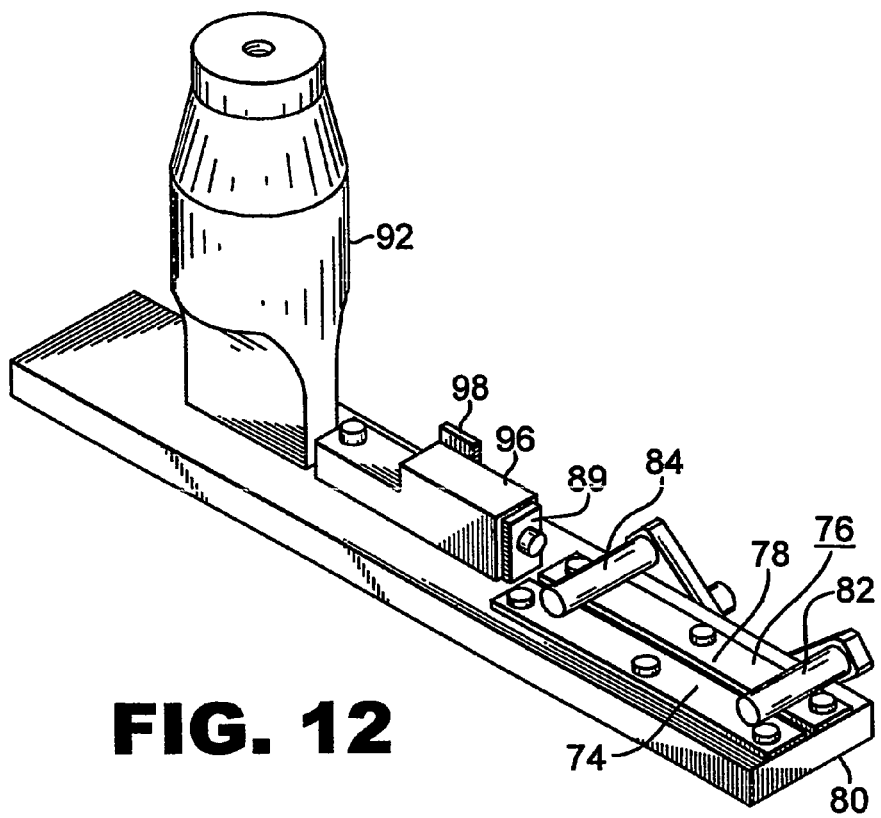
FIG. 12 is a perspective view of the apparatus for bending, and thereby rolling and wrapping the film, provided by a web of fin material, to contain the pile, and welding the film.
Figure 13:
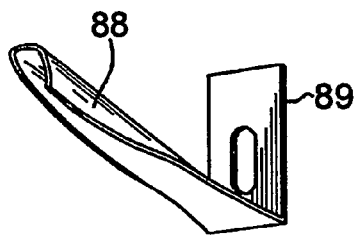
Figure 13A:
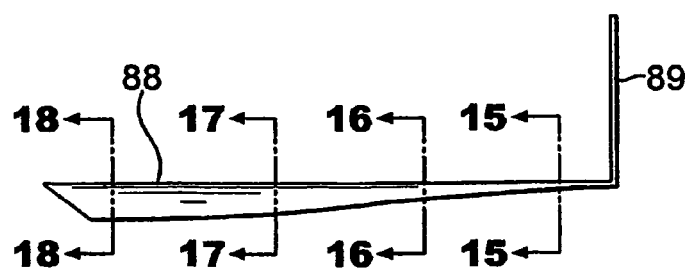
Figure 14:
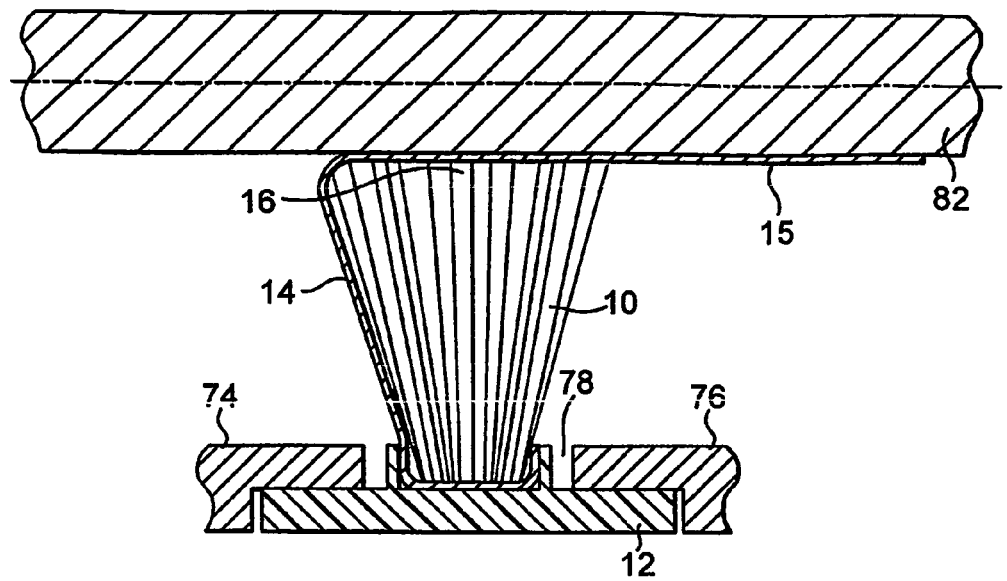
Figure 15:
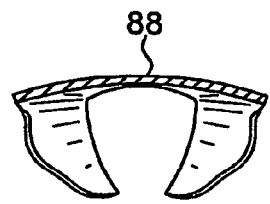
Figure 16:
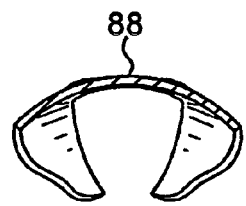
Figure 17:
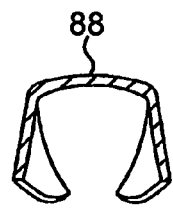
Figure 18:
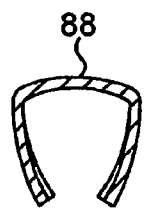
Figure 19:
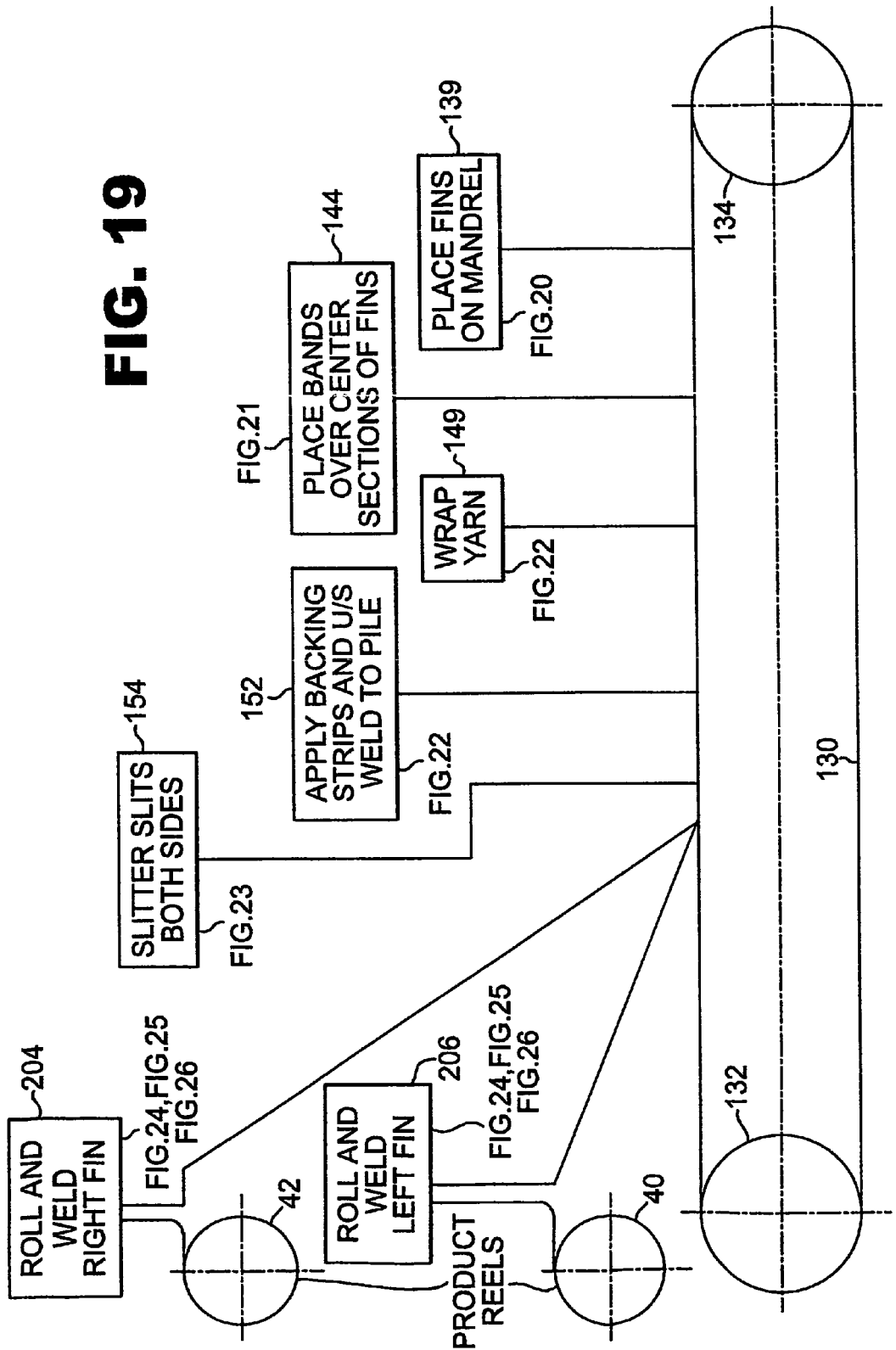
Figure 35:
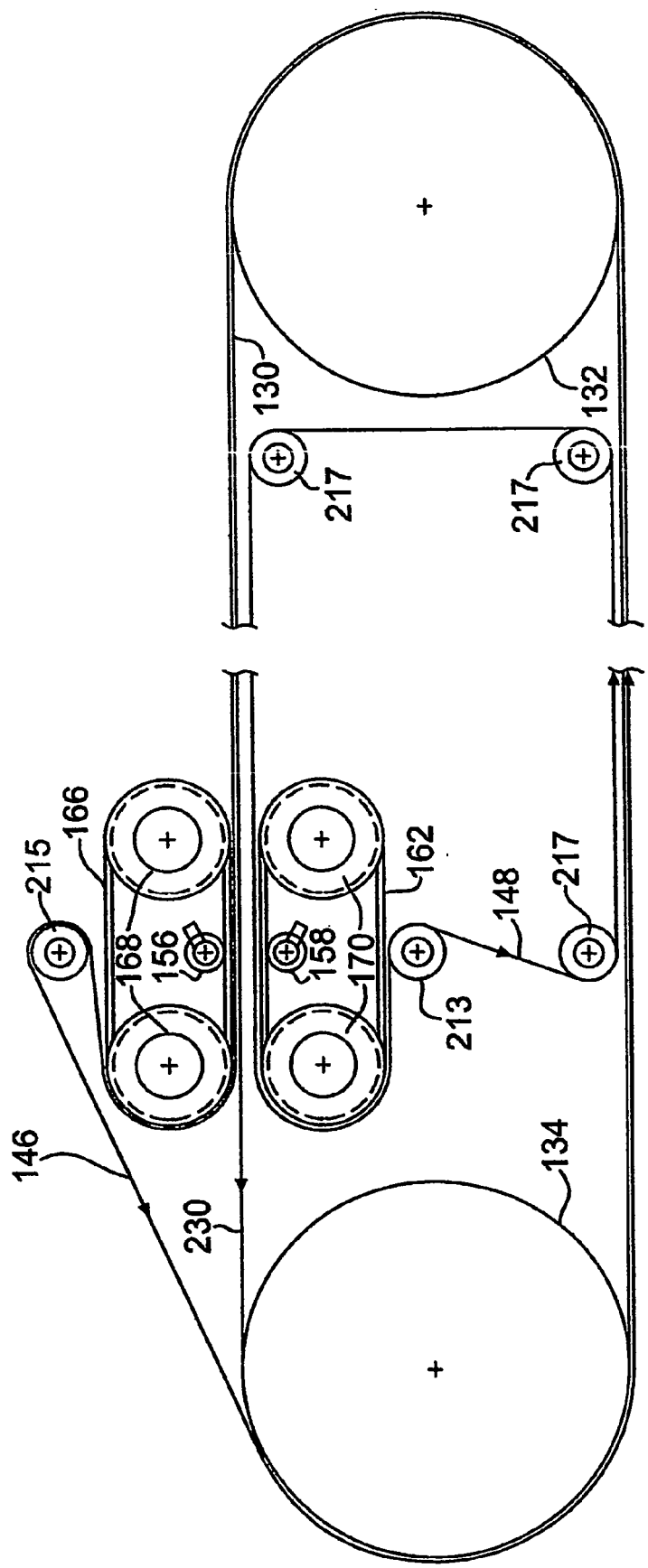
Figure 36:
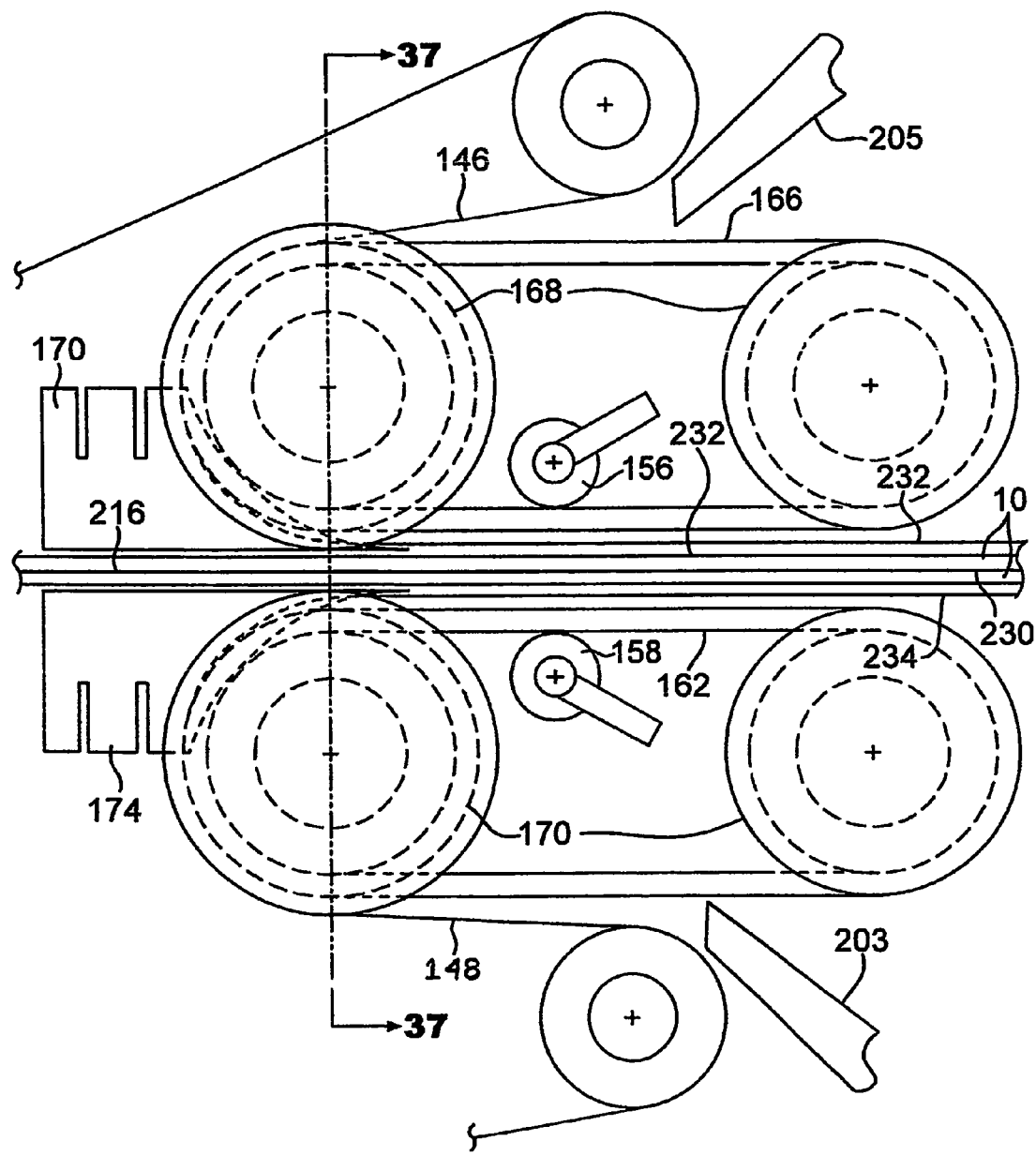
Figure 37:
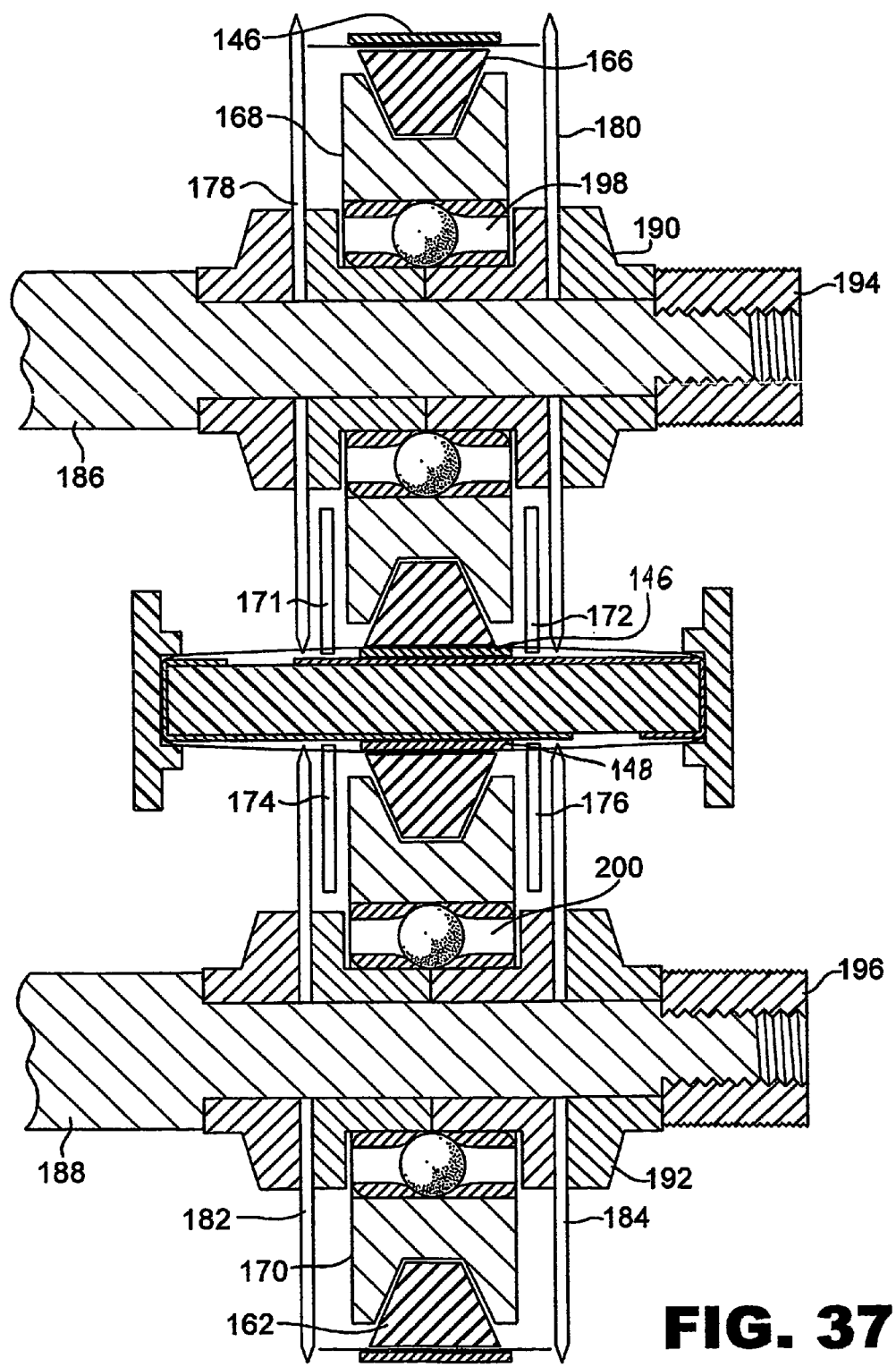

FIGS. 13, 13A and 15-18, which are cross sections of FIG. 13A taken along the lines 15-15, 16-16, 17-17, and 18-18, respectively, show the guide for bending and wrapping the film of fin material around the pile;

FIG. 14 is an end view illustrating the front end of the wrapping mechanism shown in FIG. 12;

FIG. 19 is a process diagram similar to FIG. 1 illustrating the steps in the method for making pile weatherstripping of a further embodiment of the invention having both of two parallel rows of pile wrapped and clad by films provided by webs of flexible fin material; the FIGS. indicated in FIG. 19, described below, indicate the weatherstrip in stages of manufacture in accordance with the method;

FIGS. 20-26 are cross sectional views illustrating the wrapped dual pile weatherstrip in stages of its manufacture in accordance with the method illustrated in FIG. 19;

FIGS. 27-34 are cross sectional views which illustrate pile weatherstripping, made by a method in accordance with another embodiment of the invention, in successive stages of manufacture; the product being pile weatherstripping, where one of two adjacent rows of pile is wrapped or clad by the film;

FIG. 35 illustrates, schematically and in a simplified way to show, principally, the paths for the belts and band in a mechanism for slitting yarn while leaving the flexible film available for wrapping around the row or rows of pile;

FIG. 36 is an enlarged elevational view of the slitting mechanism shown in FIG. 35; and FIG. 37 is a sectional view of the mechanism shown in FIG. 36, the section being taken along the line 37-37 in FIG. 36.

DETAILED DESCRIPTION OF THE INVENTION

Figure 10:
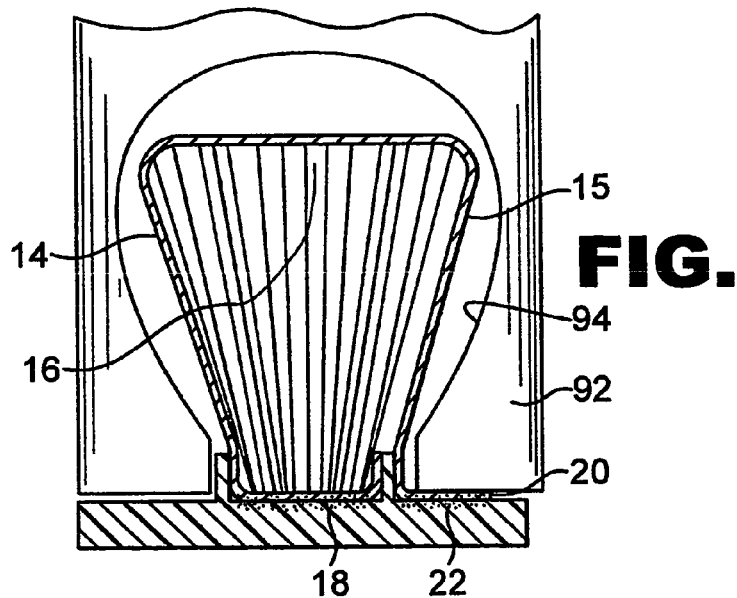
Figure 11:
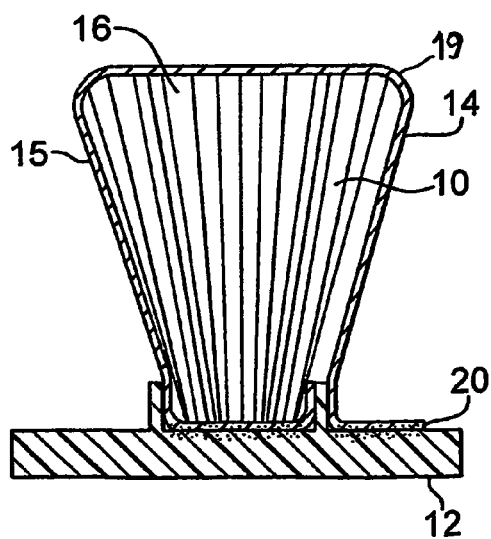

FIGS. 1 and 2 to 18 illustrate the method and apparatus for carrying out the method to manufacture the weatherstrip shown in cross-section in FIG. 11. This weatherstripping is the product of the process illustrated in FIG. 1 and its associated figures. The weatherstrip itself is a pile of yarn 10, which is suitably polypropylene yarn of the type heretofore used in pile weatherstripping manufactured by Ultrafab, Inc. and discussed in the above-referenced Larry E. Johnson patents. The pile is a continuous length which projects upwardly from a backing strip 12 of plastic material again suitably polypropylene as described in the above-referenced Larry E. Johnson patents. The pile is encased or clad and confined in a bulb by a film 14 such that the pile fills the bulb, leaving substantially no space between the film 14 and the pile 10, especially at the upper end or top 16 of the pile. By virtue of the method of manufacture illustrated in FIG. 1 and the figures associated therewith, the film extends under the pile in a zone 18 (FIG. 10) or a region along one edge of the pile, the pile 10 and the backing strip are attached by fusing them together. Such fusing is obtained through the use of ultrasonic energy and is known as ultrasonic welding. The region along the other edge 20 (FIGS. 10-11) of the pile is bent or folded around the pile and attached, preferably by ultrasonic welding in another zone 22. The clad pile of FIG. 11 is in the form of a closed bulb which extends the length of the weatherstripping and presents a surface near the top of the pile which forms a seal against a frame or sash of a window, door or other member. The sealing effect is controlled both by the pile 10 and the film 14. The compressibility of the weatherstripping is controlled by the density of the yarn in the pile 10. Air and water infiltration and dispersal characteristics are obtained by selecting the pile density and the porosity and air and water infiltration characteristics of the film. The weatherstripping product can be tailored to provide specified characteristics as regards air, water infiltration, dispersal and compressibility, and in so doing, combines the characteristics of foam or elastomeric weather seals and pile weatherstripping.

An additional feature of the invention is that by selecting a laminated, non-woven skin for the film, the pile is waterproofed. Thus, the core of the seal (the bulb under the skin) in the weatherstrip is protected against degrading effects. For example, the degrading effect of water penetrating the core and freezing makes the seal subject to rupture by the expanding water as it turns into ice. Foam seals have pores into which water can penetrate and are subject to such rupturing effects. The weatherstrip provided by the invention is not subject to such degrading effect.

Figure 9:
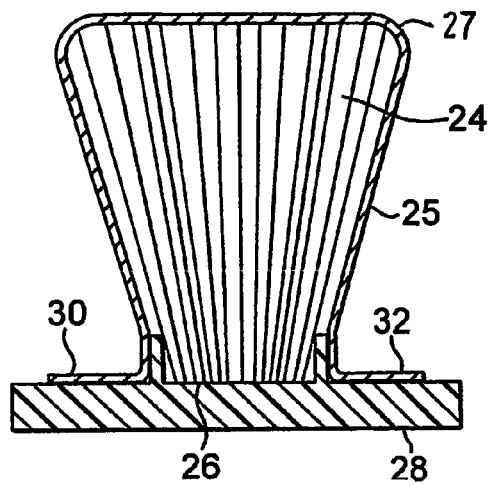
FIG. 9 shows another embodiment of the weatherstrip product.

Referring to FIG. 9, there is shown a pile weatherstrip having a pile of yarn 24 attached as by ultrasonic welding in a zone 26 at the bottom thereof to a backing strip 28. The pile 24 (forms a pile row 27) is clad by a film 25, suitably a web of fin material like the material 14. The film encases the pile so that a fully filled bulb of pile, confined and encased by the cladding fin material 25, is formed. The regions 30 and 32 along the opposite edges of the pile define the feet of the encasing film 25 and may be attached to the backing 28 as by ultrasonic welding to form an integral clad pile weather seal having characteristics similar to those described in connection with FIG. 11.

Figure 2:
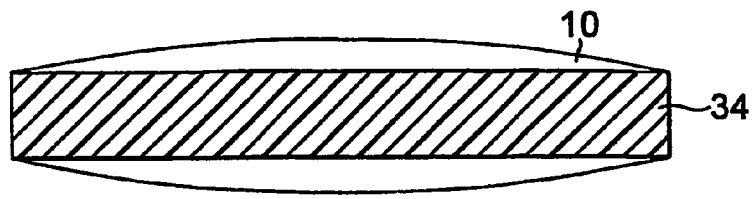
FIGS. 2-8, 10 and 11 are cross sections of the weatherstrip product in different stages of manufacture in accordance with the method illustrated in FIG. 1.

Referring to FIG. 1, there is schematically shown an endless mandrel or band 34 which is driven to travel around pulleys 36. A similar endless band or mandrel is used in apparatus described in the above-referenced Larry E. Johnson patents and the Horton patents referenced therein to make pile weatherstripping continuously. Similarly, with the method, described in these patents and used for making pile weatherstripping with the aid of a continuous mandrel, the first step of the process is the wind yarn step 38. As shown in FIG. 2, yarn is wound around the mandrel 34.

The next step is to apply the film, which since it is made of material similar to that used in fins formed inside and outside of pile in pile weatherstripping, is called a "fin"; it being understood that the term fin implies a web similar to that used in providing fins.

Figure 3:
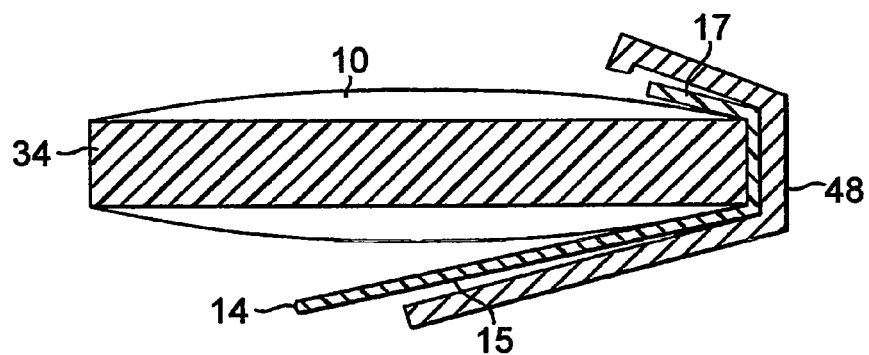

Two weatherstrips are made simultaneously with the method shown in FIG. 1. They are the weatherstrip product which is wound at the end of the process on product reels 40 and 42. In steps 44, the fin is applied to the right side of the mandrel 34 over the yarn as shown in FIG. 3 with the aide of a guide 48. The fin material may be unwound from a reel into a gap between the guide 48 and the mandrel 34, and the yarn wound around the end of the mandrel 34. There is sufficient pressure and accompanying friction to pull the fin material and unwind it from its reel as the mandrel 34 is driven around its endless circuit.

Figure 4:
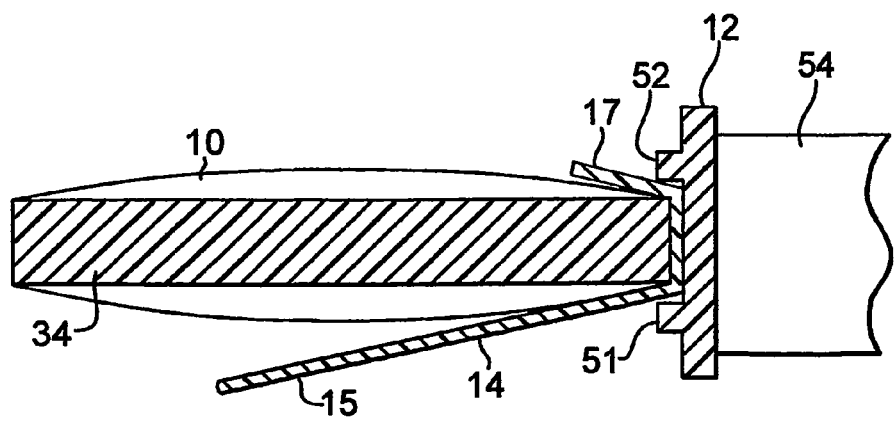
Figure 5:
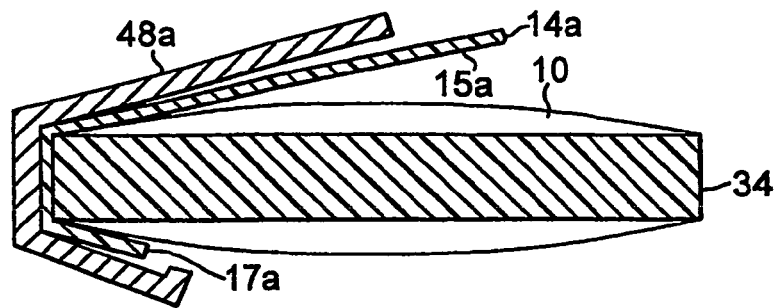
Figure 6:
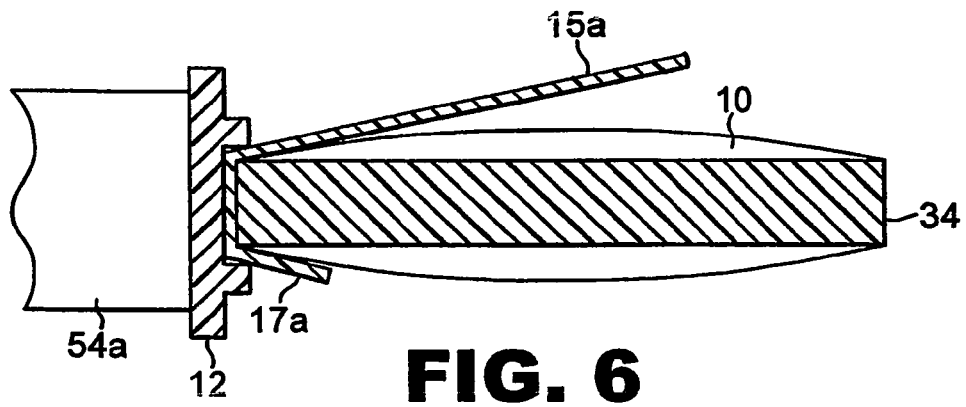

As the fin 14 leaves its guide 48, the backing strip 12 is fed over the fin and is centered by means of the ridges 51 and 52 projecting from the backing strip. Pressure is applied to the backing strip against the mandrel 34 by an ultrasonic horn 54 (See FIG. 4) which provides energy to fuse the backing strip 12, fin 14 and yarn 10 in the zone 18 (See FIG. 10). In order to make a second pile weatherstrip at the same time in the same continuous process, another fin 14a is guided by a guide 48a so that it lies on the opposite side in essentially mirror image relationship, as shown in FIGS. 5 and 6, to the fin 14 as shown in FIGS. 3 and 4. It will be observed that the fins 14 and 14a have a long side or leg 15 and 15a and a shorter side 17 and 17a. The longer side is, in subsequent steps of the process, folded or bent (i.e. wrapped) around the pile and welded in the region 22 along its outer edge 20 as shown in FIG. 10 so as to form the bulb or cladding of the pile.

The step 46 includes welding of the fin 14a and yarn 10 to another backing strip 12a by another ultrasonic horn 54a. The steps for applying the fin, as shown in FIG. 5, are indicated in FIG. 1 at 56, and the feeding/welding of the backing strip on the left side as shown in FIG. 6 are indicated in FIG. 1 at 58.

Figure 7:
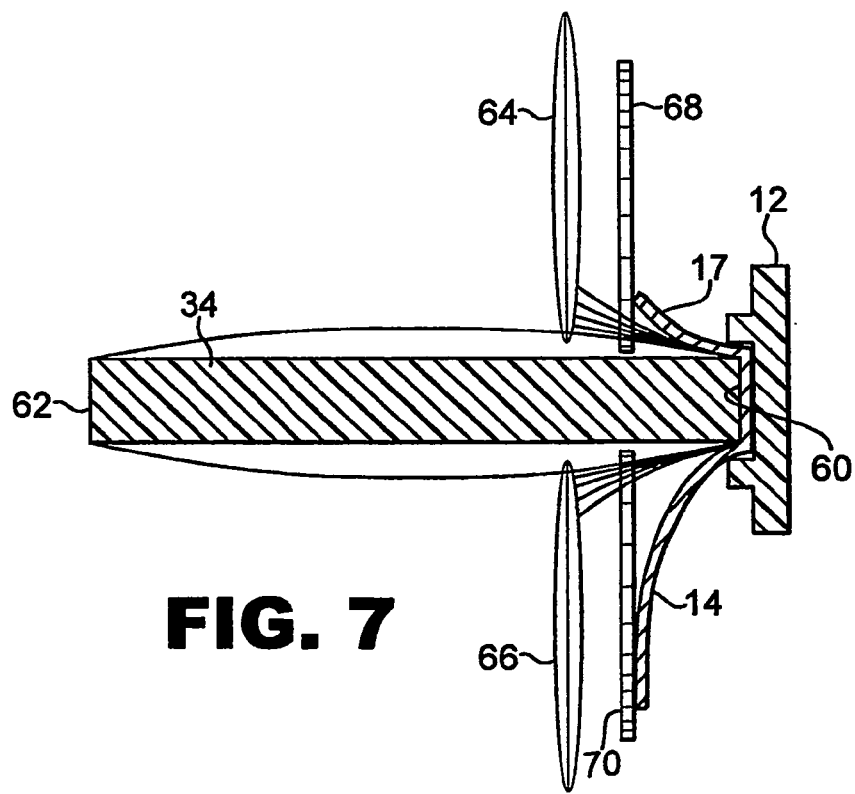
Figure 8:
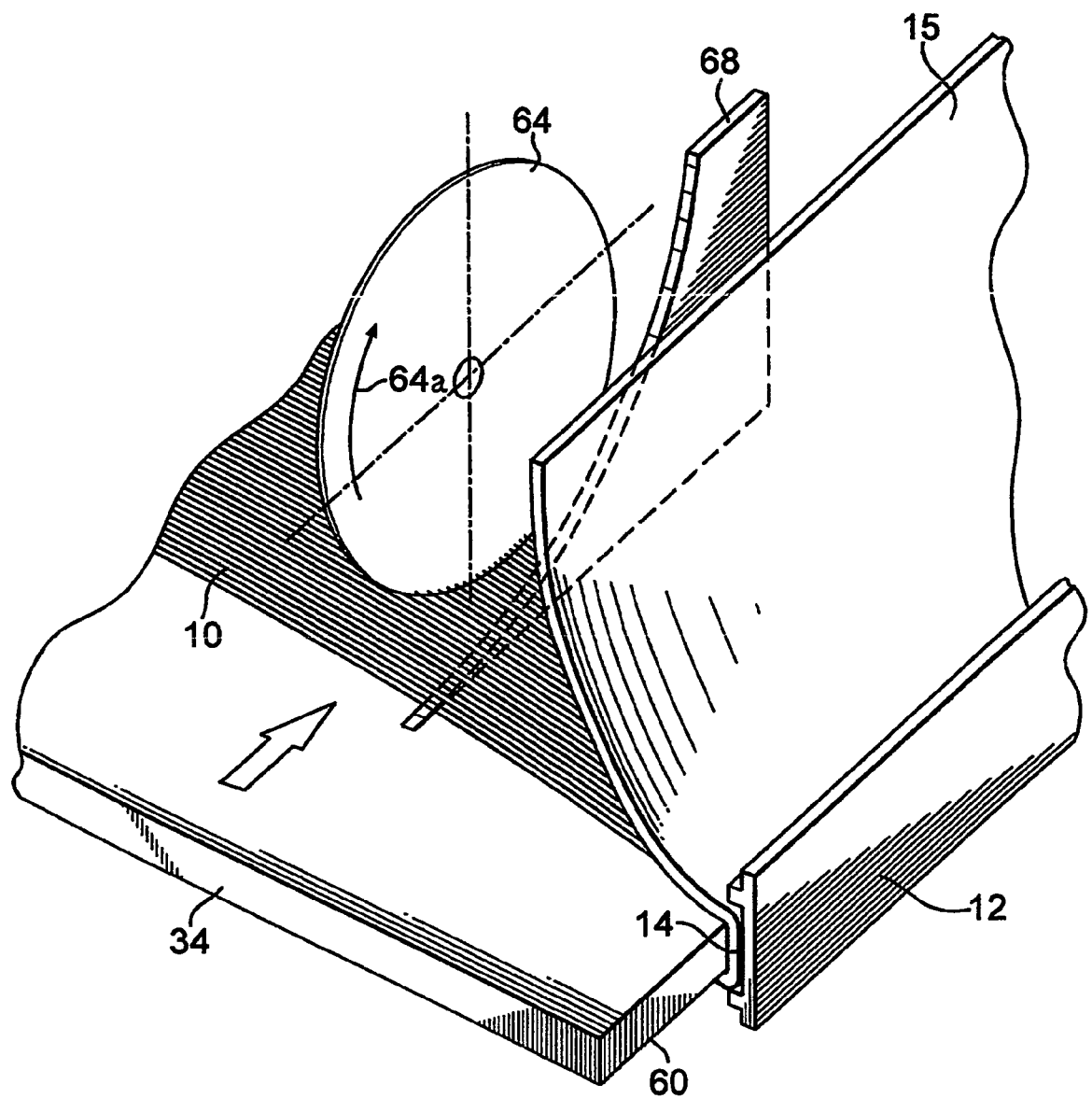

The next step in the process is to slit the yarn 10 near the right end 60 of the mandrel and also near the left end 62 of the mandrel 34. This step is indicated in FIG. 1 at 64. To simplify the illustration only the slitting of the yarn at the right side of the mandrel is illustrated in FIG. 7 and 8. To slit the yarn 10 at the left side of the mandrel, the slitting apparatus is repeated, spaced from the right side slitting apparatus shown in FIGS. 7 and 8 further along the mandrel in the direction of travel (to the left) as the mandrel 34 moves in a counter clockwise direction as shown in FIG. 1 by the arrow 35.

The apparatus shown in FIG. 7 and 8 has, as its principal parts, cutter wheels 64 and 66 and fingers 68 and 70. The fingers are close enough to the fins to lift the fins while raising the yarn pile 10. Then the cutter wheel 64, which is driven in the direction shown by the arrow 64a in the case of the cutter wheel 64 and in an opposite sense for the cutter wheel 66, slit the yarn. There are left two partially completed weatherseals with yarn piles 10. The yarn pile 10 forms a row 19 of such pile in each of the partially completed weatherseals after their removal from the mandel. Fins 14 and 14a are attached along one side under the pile to their respective backing strip 12 with the elongated side of the fins 14 and 14a extending along one side of the pile.

In the next step of the process 70, the partially completed weatherstripping as shown in FIG. 14 is separated along two paths 67 and 69. Similar apparatus and methods for wrapping the fin around the pile and welding to complete the weatherstripping are carried on each of the partially completed weatherstrips. To simplify the illustration, only one of these similar apparatus is illustrated in FIGS. 10, and 12 through 18.

As shown in FIG. 14, the backing strip 12 is threaded under ledges or guide bars 74 and 76 so that the pile 10 and the fin 14 project through a channel 78. The bars are attached to a base 80 as shown in FIG. 12.

Above the bars 74 and 76 are cylindrical guides 82 and 84. These guides are higher than the pile but lower than the upstanding section 15 of the fin 14. The guides 82 and 84 bend and wrap the longer side 15 of the fin around and over into contact with the top 16 of the pile 10, and in tight engagement therewith, as shown in FIG. 14.

Following the bars 74 and 76 is a tapered tunnel guide 88 shown in FIGS. 13 through 18. This guide has a flange 89 from which it projects rearwardly along a path to an ultrasonic horn (or head) 92. The horn 92 has a channel 94 as shown in FIG. 10. The guide 88 is mounted at a height dictated by the height of the pile 10 on a mounting block 96. The mounting block supports the tapered guide 88. The guide 88 is aligned with respect to the weatherstripping, as it moves through the channel 78, by a bracket 98 which adjustably mounts the block on the base 80. Since the guide is tapered and aligned with the pile 10, the elongated side 15 of the fin wraps around the pile so as to completely confine, encase and clad the pile. As shown in FIG. 10, the clad pile is fed through the channel 94 in the ultrasonic welding horn 92. The horn 92 is aligned so that the right side thereof engages the weld zone region 22 along the edge 20 of the fin segment 15 where ultrasonic energy is applied via the horn 92 so as to seal the row 19 of pile 10 into a bulb encasing it in the fin 14 and providing an integral weatherstrip product as shown in FIG. 11.

The other single clad row weatherstripping shown in the embodiment of FIG. 9 may be made similarly to single clad row weatherstripping described above, but in which the yarn pile is wound around the mandrel 34 and welded to a backing strip without the fin material. Next, after cutter wheels 64 and 66 cut the yarn pile to provide two partially completed weatherstrippings, fin material is applied over the resulting pile row of each of the partially completed weatherstrippings prior to insertion in apparatus 12. In apparatus 12, the fin material is bent and wrapped around pile row by member 88 to form a fully filled bulb of pile which confines and encases the pile, and then the fin material is welded in channel 94 of horn 92 in the region 30 and 32 to the backing strip.

Figure 24:
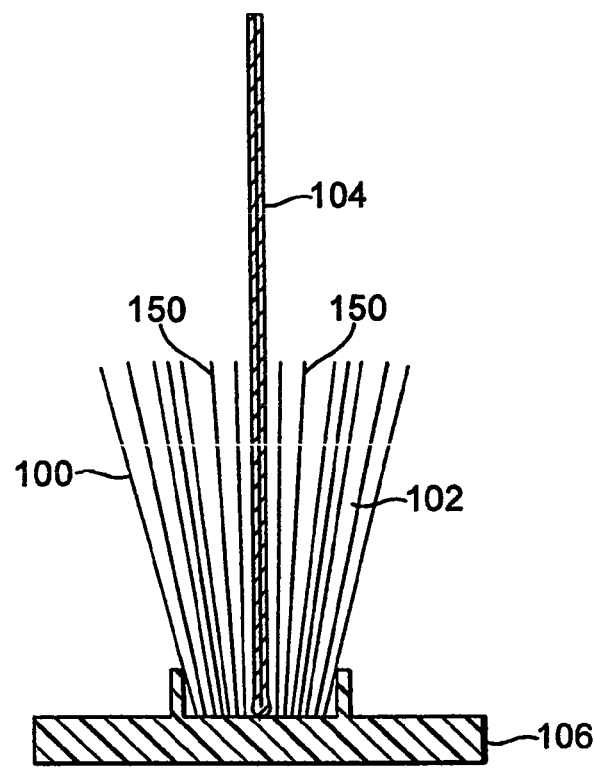
Figure 25:
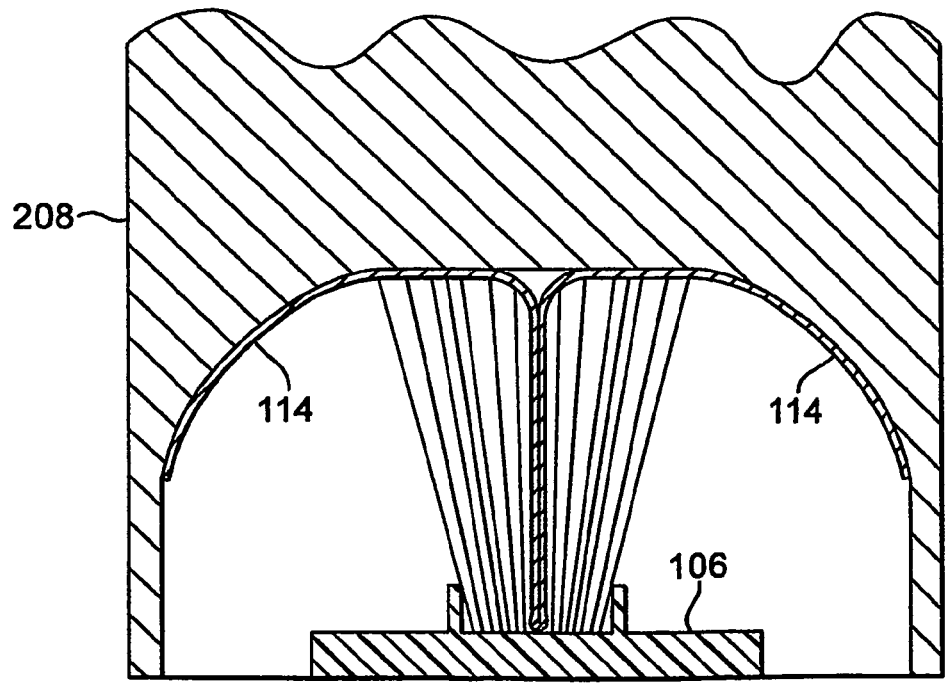
Figure 26:
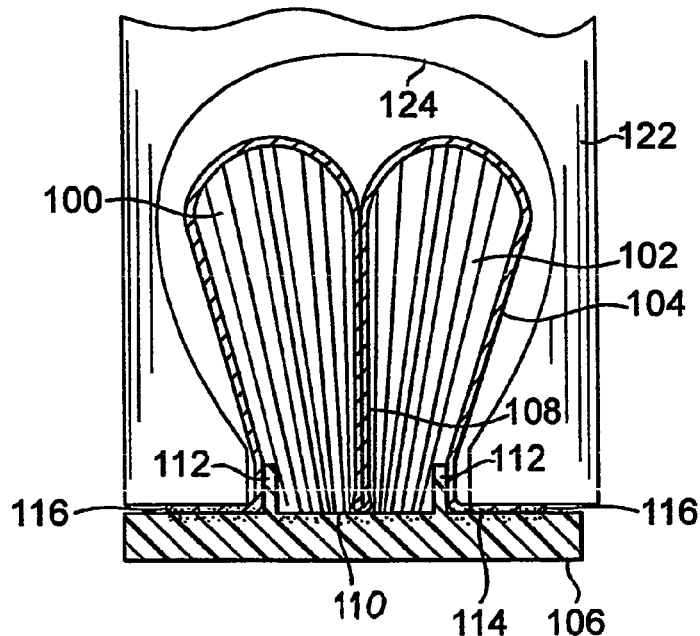

Referring next to FIGS. 19 to 26, there is illustrated the method of making dual pile wrapped clad weatherstripping which, in its last stage of manufacture is shown in FIG. 26. As shown in that figure, the weatherstrip has two rows of pile 100 and 102 which are fully enclosed into two bulbs by a film 104 of fin material, such as used in the single row pile weatherstrip described in connection with the previous figures. The bulbs formed by the cladding fin material 104 are filled with pile especially at the tops thereof which present sealing surfaces to a member of a window or door frame at which sealing is effected by the dual row clad weatherstrip.

A backing strip 106 is attached to the bottom of an interior loop 108 of the fin 104 and to the bottom of the pile rows 100 and 102. This attachment may be ultrasonic welding of the backing strip 106, the bottom of the loop 108 and the bottom of the rows of pile in a zone 110 in a channel between the ridges 112 which extend longitudinally along the upper surface of the backing strip 106. Regions 114 adjacent to the side edges 116 along opposite sides of the fin 104 are attached to the backing strip 106, preferably by ultrasonic welding. As shown in FIG. 26, a welding horn (or head) 122 has a channel or slot 124. The bulbs of clad pile 100 and 102 pass through the channel 124. The horn 122 during welding, applies ultrasonic energy in the regions 114 which fuses together and welds these regions and the upper surface of the backing strip 106.

Figure 20:
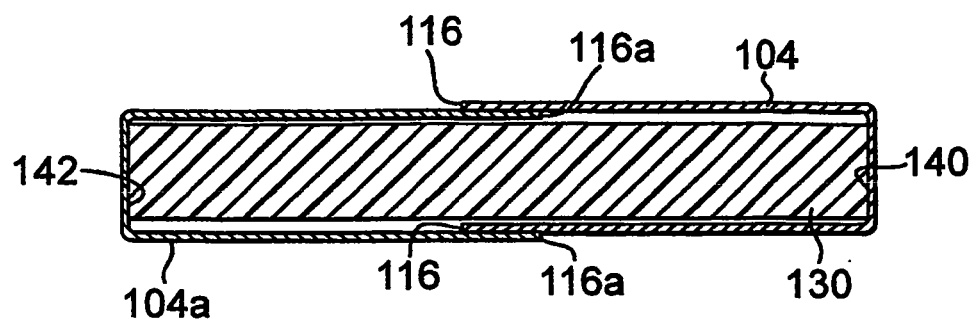

The method shown in FIG. 19 is a continuous process for producing two dual row, clad weatherstrips at the same time. The process uses an endless band or mandrel 130 which is driven around pulleys 132 and 134, similar to the mandrel 34 and the pulleys 36 shown in FIG. 1. In order to arrange the film or web of fin material so that it can be wrapped around two side by side rows of pile, a web 104 and another web 104a are guided to the mandrel and folded around opposite ends 140 and 142 of the mandrel. Regions along opposite edges 116 and 116a are arranged in overlapping relationship, as shown in FIG. 20. This completes the "place fins on mandrel" step 139 of FIG. 19.

Figure 21:
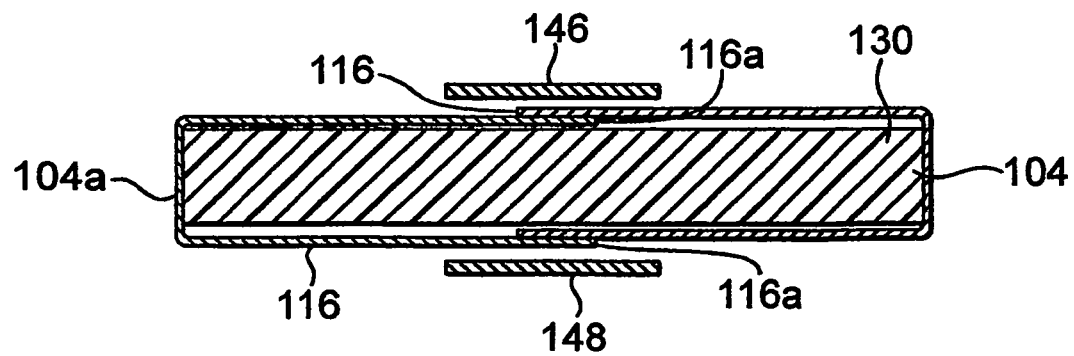
Figure 22:
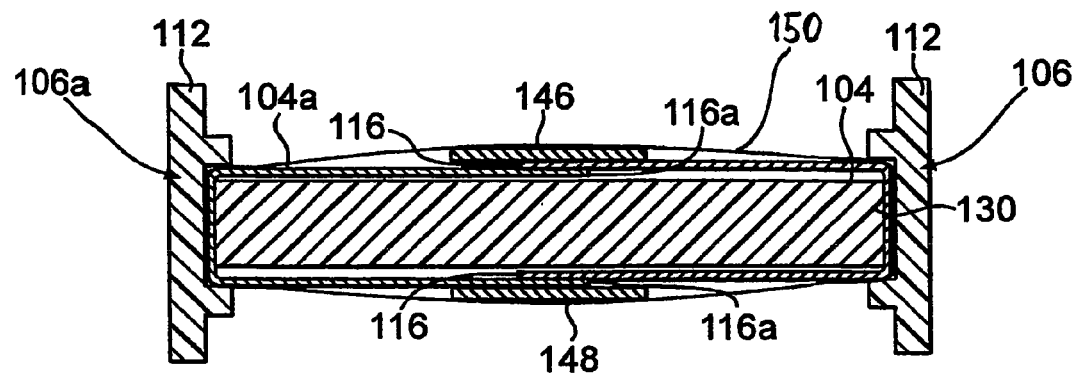

FIG. 21 shows the result of the next step which is to place bands 146 and 148 over center sections (the overlapping sections of the ends 116 and 116a) of the fins 104 and 104a. This step is shown at 144 in FIG. 19. In FIG. 21, the bands 146 and 148 are shown. These are endless bands which are entrained around the mandrel 130 and driven pulleys 132 and 134. In FIG. 36, the path of the bands 146 and 148 is shown, together with the mechanism for slitting center sections of the yarn. The bands overlie the overlapping end regions of the fins 104 and 104a. The relationship of the overlying end regions may be reversed or one set of ends 116 may be inside or outside of the other set of ends 116a.

The next step 149 is to wrap yarn 150. The wrapped yarn forms the pile rows 100 and 102 of each of the two weatherstrips which are made simultaneously by the process of FIG. 19. The yarn pile 150 is wrapped over the overlapping ends 106 and 106a, and compresses the bands 146 and 148 against the overlapping center regions of the fins 104 and 104a (See FIGS. 22 and 23). In the next step 152, backing strips 106 and 106a are attached and welded to the pile.

Figure 23:
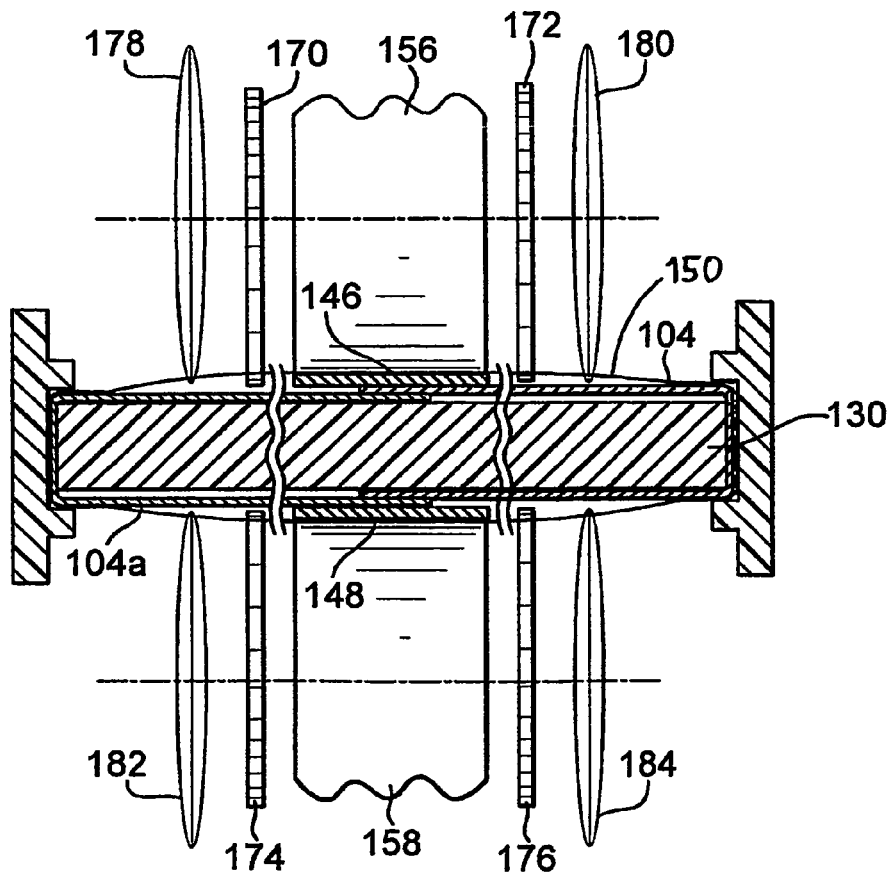

In the next step 154, the mandrel, with the wrapped pile over and backing the bands 146 and 148 and the fins 104 and 104a, is slit by the slitter mechanism, as shown in FIG. 23. The slitter mechanism is more fully shown in FIGS. 35 to 37. During slitting in the slitter mechanism the center region of the yarn over the bands is held down, suitably by rollers 156 and 158, in FIGS. 35-37 alone, (as in FIG. 23) or with rubber V-belts 162 and 166 which are entrained around sets of pulleys 168 and 170, also as shown in FIGS. 36 and 37. The paths of the band 146 and 148 are about tensioning idler pulleys 213 and 215 (FIG. 35 and 36). The band 146 executes a loop around the outside of the mandrel 130 over the mandrel pulleys 132 and 134. The drive for the belt is taken off the mandrel 130, since the belt 146 frictionally engages the mandrel 130. The belt 148 executes a loop defined by the pulleys 170, idler pulley 213 and other idler pulleys 217.

The yarn 150 is held down by the rollers 156 and 158 against the bands 146 and 148. The fins 104 and 104a are also held down via the bands 146 and 148 by the rollers 156 and 158. Fingers 171, 172, 174, and 176 raise the yarn 150 into cutting engagement with driven cutter wheels 178, 180, 182, and 184. These wheels are engaged and turned with driven shafts 186 and 188. The cutter wheels are held in place on the shafts 186 and 188, by collars 190 and 192 which are fastened to the drive shafts 186 and 188 by lock nuts 194 and 196. The latter are shown in detail in FIG. 37. The pulleys 168 and 170 around which the V-belts 162 and 166 extend and are permitted to free wheel by being mounted on bearing sleeves 198 and 200, also as shown in FIG. 37. As shown in FIG. 23, the cutter wheels remove the center sections of the yarn where these center sections are carried around and out of the slitter mechanism to vacuum pickups 203 and 205 adjacent to the pulleys 168 and 170 where they are removed from the slitter. The location of these vacuum pickups 203 and 205 is shown in FIG. 36.

After the center sections are cut out and removed by the slitter mechanism, there remains two pile weatherstrips having two pile rows 100 and 102 (FIG. 24) separated by overlapping lengths of fin 104 which are longer than the height of the pile rows 100 and 102, and sufficiently long to be rolled and wrapped around pile rows 100 and 102. The fin 104 is effectively compressed as shown in FIG. 24 upon removal from the mandrel 130. This rolling and wrapping step 204 and 206 is carried out after the slitting step 154 and the separation of the weatherstrips. The separated weatherstrips are then passed into rolling guides such as the guide 208 shown in FIG. 25. The end regions 114 are guided against the backing 106 and welded to the backing ultrasonically by the welding head 122 as shown in FIG. 26. The resulting weatherstrips from step 204 and 206 are wound on product reels 42 and 40, respectively. For purposes of illustration, only the weatherstrip having fin 104 and backing strip 106 is shown in FIGS. 24-26, but as indicated in FIG. 19 the operations shown in these figures are also performed on the weatherstrip having fin 104a and backing strip 106a.

Figure 34:
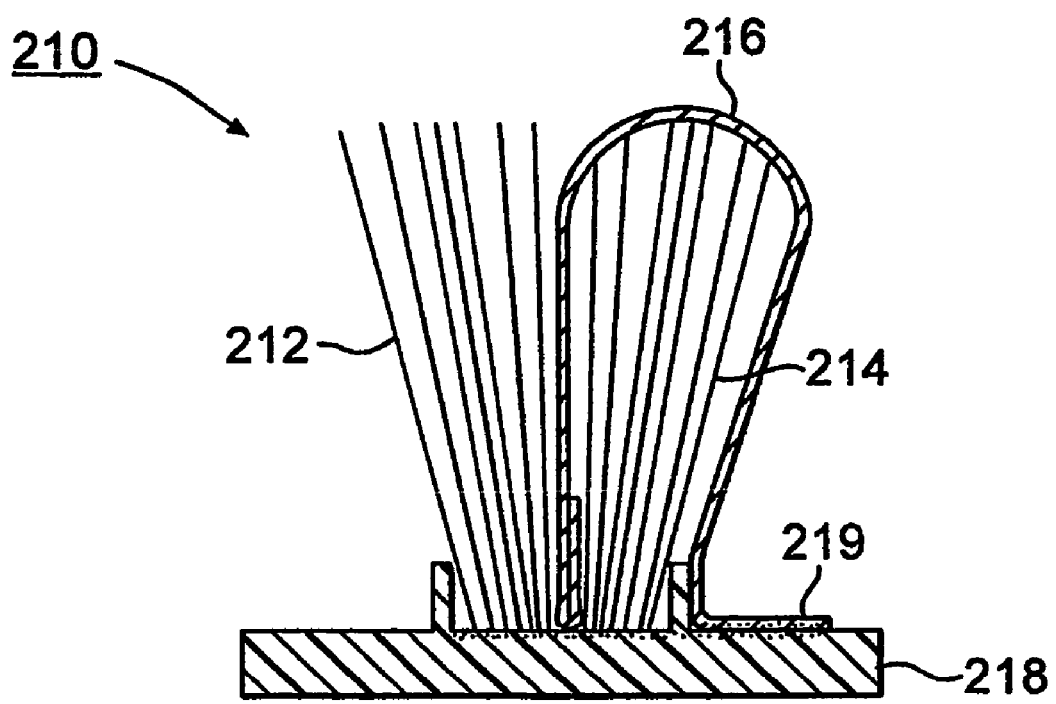

FIG. 34 shows weatherstrip 210 having two rows 212 and 214 of pile only one of which 214 is clad by fin material 216. The cladding fin 216 forms a bulb which is filled completely and encases the row 214. Both rows 212 and 214 of pile and the fin 216 are attached as by ultrasonic welding to a backing strip 218.

Figure 27:
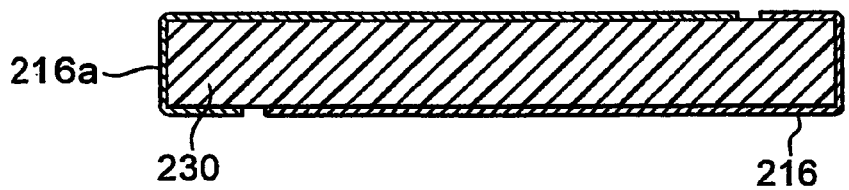
Figure 28:
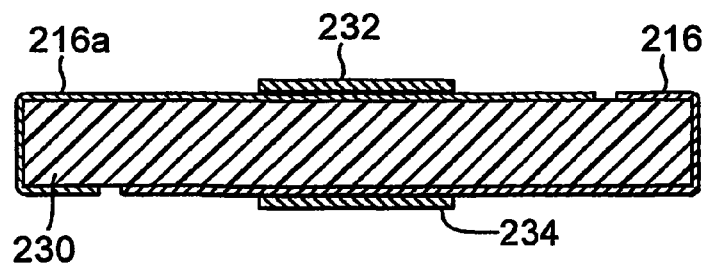

The method of making the single clad, dual pile row weatherstripping is similar to the method of making the weatherstripping in FIG. 26 where both rows 100 and 102 of pile are clad. In case of the single clad row of weatherstripping 210, overlapping webs of thin material 216 and 216a form J-sections when placed on an endless band or mandrel 230 as shown in FIG. 27. As shown in FIG. 28, bands 232 and 234 hold down and grip the center sections of the fins 216 and 216a against the mandrel 230.

Figure 29:
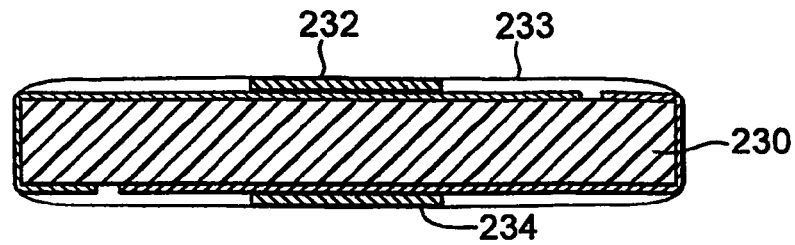
Figure 30:
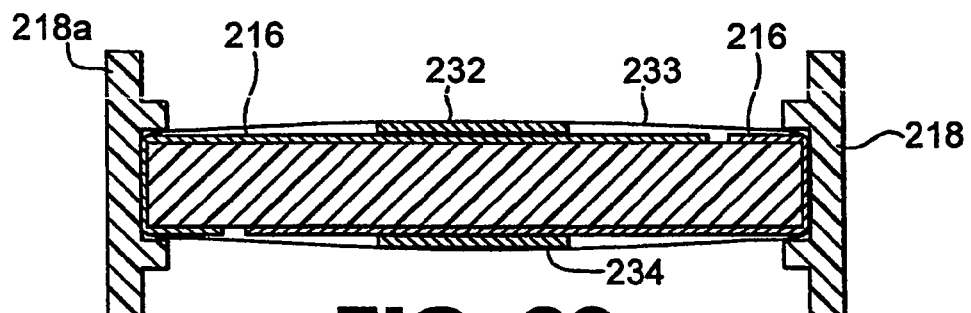
Figure 31:
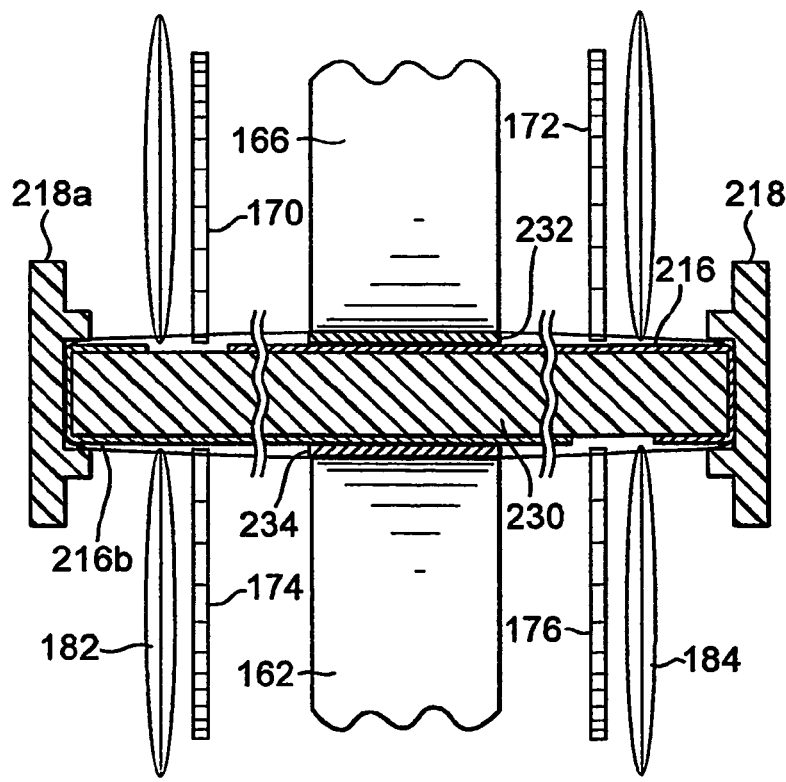

As shown in FIG. 29, the yarn pile 233 is wound around the mandrel 230 over the fins 216 and 216a and the bands 232 and 234. The backing strips 218 and 218a are then welded to the ends of the weatherstrips attaching the backing strips 218 and 218a to the ends of the fins 216 and 216a and the yarn pile 233. The mandrel with the welded backing strips attached then goes to a cutting mechanism similar to the mechanism in connection with FIGS. 36 and 37. The weatherstrips as they are being cut are illustrated in FIG. 31.

Figure 32:
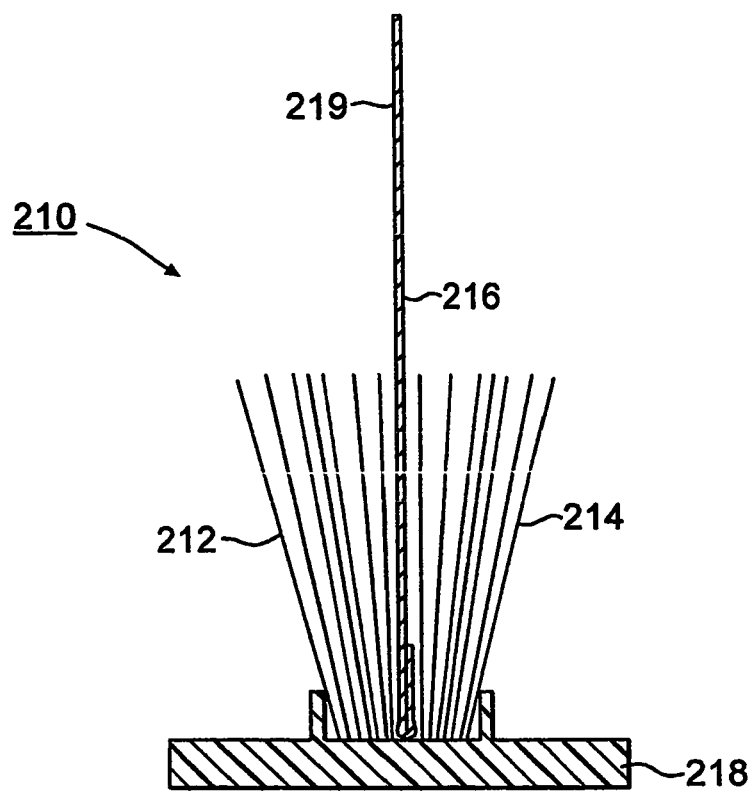
Figure 33:
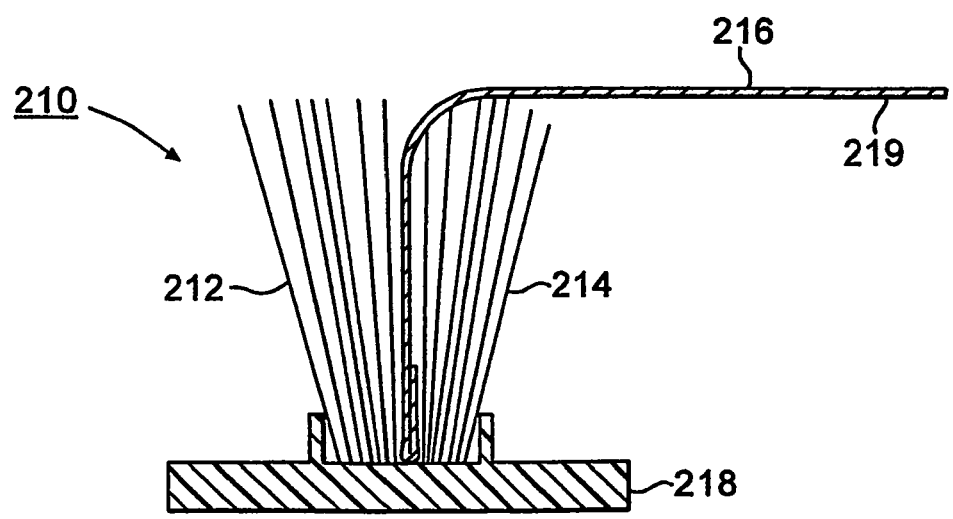

After being cut the weatherstrips are separated where the separated weatherstrips are each like the one shown in FIG. 32 with an upstanding fin 216. This fin in the next step is rolled around to clad the pile row 214 and the outside edge region 219 is welded to the backing strip 218 outside of the pile row 214, such as using a guide similar to guide 208. The weatherstrip going into the rolling and welding step is shown in FIG. 32. FIG. 33 shows the weatherstrip 210 with the fin 216 while it is being rolled. The final one clad row weatherstrip 210 is shown in FIG. 34. For purposes of illustration, only the weatherstrip having fin 216 and 218 is shown in FIGS. 32-34, and the same operations of FIGS. 32-34 are performed on the weatherstrip having fin 216a and backing strip 218a.

The completed weatherstrip product of the different embodiments of FIGS. 9 (single clad pile row), 11 (single clad pile row), 26 (dual clad pile rows), and 34 (dual pile rows, one clad, one unclad) have air and water infiltration and dispersal characteristics obtained by selecting the pile density and the porosity and air and water infiltration characteristics of the flexible fin material. The weatherstripping product can be tailored to provide specified characteristics as regards air, water infiltration, dispersal and compressibility, and in so doing, combines the characteristics of foam or elastomeric weather seals and pile weatherstripping. Further, by selecting a laminated, non-woven skin for fin material, rather than a textile or web material, the pile row within such fin material forming the bulb in the embodiments may be made waterproofed.

From the foregoing description it will be apparent that there has been provided improved pile weatherstripping having one or more clad rows of pile. Other embodiments which are variations and modifications of the herein described pile weatherstripping and modifications in the method of manufacture thereof will undoubtedly become apparent to those skilled in the art. Accordingly the foregoing description should be taken as illustrative and not in any limiting sense.

What is claimed is:

1. Pile weatherstripping which comprises at least one row of yarn providing a pile on a backing strip with the pile having a base extending upwardly above said backing strip, a film of flexible material encasing said pile and conforming to said pile providing a clad pile, said film, pile and backing strip being unremovably attached to each other with said film attached along opposite sides of said base, to form an integral clad pile weatherseal, said film presenting on one side a sealing surface and on the opposite side a surface yieldably supported by said pile without any space between the pile and the film from said base along one of the opposite sides thereof over said pile and to the other of the opposite sides of said base.

2. The pile weatherstripping of claim 1 wherein said pile is confined into a bulb by said film.

3. The pile weatherstripping of claim 1 wherein said pile is a bulb of said yarn clad by said film ultrasonic welds along the opposite sides of said base to said backing strip.

4. The pile weatherstripping of claim 3 wherein said bulb is completely filled by said pile over said pile from said opposite sides of said base.

5. The pile weatherstripping of claim 1 wherein said film is a web of textile material.

6. The pile weatherstripping of claim 5 wherein said pile and said web material is capable of dispersing air and water infiltrating said web into said pile.

7. The pile weatherstripping of claim 1 wherein said film is a fin of material which is air infiltratable.

8. The pile weatherstripping of claim 5 wherein said web is a cloth of felted or flocked plastic fibers.

9. The pile weatherstripping of claim 8 wherein said fibers are of polypropylene.

10. The pile weatherstripping of claim 1 wherein said pile extends longitudinally in a plurality of rows, said film encasing at least one of said rows.

11. The pile weatherstripping of claim 10 wherein two of said rows are adjacent to each other, said film encasing one of said two rows and the other of said two rows being an independently extending upright pile.

12. The pile weatherstripping of claim 10 wherein said rows are separately encased by said film to separately provide a pair of encased piles wherein the films conforming to said rows present separate sealing surfaces.

13. The pile weatherstripping of claim 10 wherein said plurality of rows are confined into at least one bulb encased and clad by said film while the other row is not so encased.

14. The pile weatherstripping of claim 10 wherein said plurality of rows are separately encased by films into side-by-side bulbs wherein said rows are clad by film material.

15. The pile weatherstripping of claim 13 wherein said film is a web of textile material.

16. The pile weatherstripping of claim 14 wherein said film is a web of textile material.

17. The pile weatherstripping of claim 15 wherein said film is a cloth fiber which together with said pile has certain air and water infiltratibility.

18. The pile weatherstripping of claim 17 wherein said films are felted or flocked to provide said cloth.

19. The pile weatherstripping of claim 18 wherein said fibers are polypropylene material.

20. The pile weatherstripping of claim 1 wherein said film is a laminated, non-woven, water impervious skin.

21. A method of making pile weatherstripping which comprises the steps of wrapping a web of flexible material around a row of pile from along opposite sides of said base of said pile and having a base attaching said web and pile to a backing along said opposite sides in integral, non-removable relationship among said web pile and backing to form a bulb of pile sealingly attached along edges of said web to said backing and clad by said web leaving no space between said pile and said web from said opposite sides at said backing and over said pile.

22. The method of making pile weatherstripping according to claim 21 further comprising the step of ultrasonically welding to said backing said web along said opposite sides of the base of said pile before and after wrapping said web to close said bulb.

23. The method of making pile weatherstripping according to claim 22 wherein said welding step is carried out to said backing from which said pile extends and along a zone along said opposite sides where said pile meets said backing.

24. The method of making pile weatherstripping according to claim 21 wherein said wrapping step is carried out to conform said web to said pile on the outside thereof thereby completely filling said clad bulb with said pile.

25. The method of making pile weatherstripping according to claim 21 wherein said wrapping step is carried out over at least one of a pair of adjacent rows of pile to provide either one bulb of clad pile along side of a row of unclad pile or a pair of adjacent bulbs of clad pile.

26. The method of making pile weatherstripping according to claim 25 wherein said pile is made by winding yarn around a band, and said web is placed over said yarn or under said yarn between said band and said yarn, cutting said yarn to form said pile, then carrying out said wrapping step to provide, with said web over said yarn after said wrapping step, a row of clad pile, and with said web which is under said yarn, one or two adjacent rows of clad pile on said backing.

27. The method of making pile weatherstripping according to claim 26 wherein said yarn, said web, along one edge thereof, and a backing are assembled in a first ultrasonic welding step, and wherein said web is attached to said backing along another edge opposite thereof to said one edge after said wrapping step in a second ultrasonic welding step.

28. The method of making pile weatherstripping according to claim 27 wherein said wrapping step is carried out with a guide through which said pile and web are driven thereby bending said web into conforming relationship with said pile to provide one or a plurality of rows of clad pile.

29. The pile weatherstripping of claim 1, wherein said pile projects from said backing, said film is sealingly attached along edges thereof to said backing longitudinally along said backing along said opposite sides of said base and completely encases said pile between said edges of said film.

* * * * *